UNITED STATES PATENT OFFICE.

ELWOOD GOSSETT, OF KANSAS CITY, KANSAS, ASSIGNOR OF ONE-HALF TO ALFRED N. GOSSETT, OF KANSAS CITY, MISSOURI.

PAINT-OIL.

979,662. Specification of Letters Patent. Patented Dec. 27, 1910.

No Drawing. Application filed April 28, 1909. Serial No. 492,674.

*To all whom it may concern:*

Be it known that I, ELWOOD GOSSETT, a citizen of the United States, residing at Kansas City, in the county of Wyandotte and State of Kansas, have invented certain new and useful Improvements in Paint-Oil; and I do declare the following to be a full, clear, and exact description of the invention, such as will enable others skilled in the art to which it appertains to make and use the same.

My invention relates to a new composition of matter for use as a paint oil or paint vehicle, and has for its object to provide a substitute for the linseed oil which is ordinarily used for that purpose.

In the manufacture of my composition I use the following ingredients, in substantially the proportions given:—paraffin oil, 2 gallons; gloss oil, 1 gallon; linseed foots, 1 gallon. The gloss oil mentioned comprises resin mixed with benzin (or a like thinner) and its function is to provide the size to the composition.

By the term "foots" I mean the dregs or sediment which is left as a residue in tanks where linseed oil has been drained or strained off. It is oily and gummy in consistency.

In compounding my ingredients I thin down the foots by diluting with naphtha, gasolene or benzin. After being thinned to the proper consistency the liquid is to be filtered in order to free it of dirt and other foreign particles. I then prepare a mixture of paraffin oil and gloss oil. Either "extra golden" or "diamond" paraffin contains enough paraffin (wax) to form a gum with or of the resin contained in the gloss oil. I then mix the thinned foots with this mixture of paraffin and gloss oil. No heating is necessary. When combined in the proportions specified above, the product will be an oil having about the same drying time as boiled linseed oil. A quicker drying product may be produced by lessening the proportionate quantities of the thinning agent, *i. e.* the benzin or gasolene; and slower drying product by increasing such proportions.

My composition as described will be characterized by "life" and elasticity which are the desirable qualities for a paint vehicle.

Having thus described my invention, what I claim as new therein and desire to secure by Letters-Patent is:—

A paint vehicle comprising a mixture of thinned linseed foots, paraffin oil, and gloss oil, in the proportions of 1 gallon of the first, 2 gallons of the second, and one gallon of the third.

In testimony whereof I affix my signature in presence of two witnesses.

ELWOOD GOSSETT.

Witnesses:
 MYRTLE M. JACKSON,
 E. A. CAHILL.